United States Patent
Carson et al.

(10) Patent No.: US 12,304,644 B2
(45) Date of Patent: *May 20, 2025

(54) VARIABLE MODE TIMING WITH DIVERGENCE INHIBIT

(71) Applicant: Rockwell Collins, Inc., Cedar Rapids, IA (US)

(72) Inventors: Kassidy L Carson, Colorado Springs, CO (US); Bradley Mastrolia, Colorado Springs, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 283 days.

This patent is subject to a terminal disclaimer.

(21) Appl. No.: 17/986,745

(22) Filed: Nov. 14, 2022

(65) Prior Publication Data

US 2024/0158089 A1    May 16, 2024

(51) Int. Cl.
*B64D 25/10*    (2006.01)
*B64D 17/62*    (2006.01)
*G01C 5/06*    (2006.01)
*G01P 5/16*    (2006.01)

(52) U.S. Cl.
CPC .............. *B64D 25/10* (2013.01); *B64D 17/62* (2013.01); *G01C 5/06* (2013.01); *G01P 5/16* (2013.01)

(58) Field of Classification Search
CPC ......... B64D 25/10; B64D 17/62; B64D 17/74
See application file for complete search history.

(56) References Cited

U.S. PATENT DOCUMENTS

| | | |
|---|---|---|
| 4,505,444 A | 3/1985 | Martin |
| 5,104,066 A | 4/1992 | Aronne |
| 7,584,928 B2 | 9/2009 | Hoffmann |
| 11,208,214 B2 | 12/2021 | Western et al. |
| 11,827,366 B1 | 11/2023 | Benjamin et al. |
| 11,834,185 B2 * | 12/2023 | Carson .................. B64D 17/56 |
| 2022/0097861 A1 | 3/2022 | McCumber et al. |

FOREIGN PATENT DOCUMENTS

GB    2616720    9/2023

OTHER PUBLICATIONS

United Kingdom Intellectual Property Office, United Kingdom Search Report dated Apr. 15, 2024 in Application No. GB2317423.8.

* cited by examiner

*Primary Examiner* — Justin M Benedik
(74) *Attorney, Agent, or Firm* — SNELL & WILMER L.L.P.

(57) ABSTRACT

A method is disclosed herein. The method includes receiving, by a processor, an ejection command for ejecting an ejection seat from an aircraft; determining, by the processor, an equivalent airspeed and an equivalent altitude of the ejection seat; and, responsive to the airspeed and the altitude indicating a second mode of operation: sending, by the processor, a command to deploy a drogue parachute; determining, by the processor, a variable drogue severance delay; and responsive to the variable drogue severance delay expiring, sending, by the processor, a command to sever the drogue parachute and deploy a main parachute.

20 Claims, 11 Drawing Sheets

VARIABLE MODE TIMING WITH DIVERGENCE INHIBIT

FIELD

The present disclosure generally relates to ejection seats, and more particularly, to controlling ejection seat systems.

BACKGROUND

Current ejection seats utilize a high energy catapult assembly (sometimes referred to as a rocket-catapult assembly) to expel the ejection seat from an aircraft. The high energy catapult assembly is an energetic device that includes a catapult stage and a rocket stage. The catapult stage fires first, ejecting the ejection seat and any occupant of the ejection seat from the aircraft cockpit. The rocket stage then ignites and propels the ejection seat and its occupant to a separation distance from the aircraft and terrain associated with safe parachute recovery.

Current ejection seats may include a pitot system, which collects dynamic air pressure data upon the air inlet of the pitot tube entering the airstream outside the cockpit. The dynamic air pressure data is used by the ejection seat controller, along with static air pressure taken from a separate air inlet, for ejection mode selection. For example, the controller may determine an equivalent altitude and equivalent airspeed based on the dynamic and static air pressure data. The controller then selects an ejection mode based on the altitude and airspeed. The selected ejection mode controls the timing sequence for deploying one or more ejection seat subsystem(s). For example, the timing for delaying deployment of the main parachute and/or delaying (or inhibiting) drogue parachute may be based on the selected ejection mode (i.e., different ejection modes employ different timing sequences and events).

SUMMARY

A method is disclosed herein. The method includes receiving, by a processor, an ejection command for ejecting an ejection seat from an aircraft; determining, by the processor, an equivalent airspeed and an equivalent altitude of the ejection seat; and, responsive to the airspeed and the altitude indicating a second mode of operation: sending, by the processor, a command to deploy a drogue parachute; determining, by the processor, a variable drogue severance delay; and responsive to the variable drogue severance delay expiring, sending, by the processor, a command to sever the drogue parachute and deploy a main parachute.

In various embodiments, the variable drogue severance delay is determined using at least one of a polynomial calculation, a quadratic calculation, or a linear calculation, to include minimum and maximum bounds. In various embodiments, the polynomial calculation uses a static pressure of the ejection seat for the equivalent altitude, a dynamic pressure of the ejection seat for the equivalent airspeed, and four constants. In various embodiments, the static pressure is determined using a static pressure sensor coupled to the ejection seat. In various embodiments, the dynamic pressure is determined using at least one dynamic pressure sensor coupled to a pitot tube coupled to the ejection seat.

In various embodiments, the method further includes, responsive to the airspeed and the altitude indicating a first mode of operation, sending, by the processor, a command to deploy the main parachute without deploying the drogue parachute. In various embodiments, the method further includes, responsive to the altitude indicating a third mode of operation: sending, by the processor, the command to deploy the drogue parachute; determining, by the processor, whether a predetermined altitude has been achieved and whether a minimum viable delay has expired; and responsive to the predetermined altitude being achieved and the minimum viable delay being expired, sending, by the processor, the command to sever the drogue parachute and deploy the main parachute. In various embodiments, the determining is further based on an equivalent altitude and an equivalent airspeed relative to sea level conditions.

Also disclosed herein is a system including an ejection seat including a drogue parachute and a main parachute; a dynamic pressure sensor; a static pressure sensor; a processor; and memory operatively coupled to the processor, the memory comprising instructions stored thereon that, when executed by the processor, cause the processor: determine an equivalent airspeed of the ejection seat using the dynamic pressure sensor; determine an equivalent altitude of the ejection seat using the static pressure sensor; and, responsive to the airspeed and the altitude indicating a second mode of operation: send a command to deploy the drogue parachute; determine a variable drogue severance delay; and responsive to the variable drogue severance delay expiring, send a command to sever the drogue parachute and deploy the main parachute.

In various embodiments, the variable drogue severance delay is determined using at least one of a polynomial calculation, a quadratic calculation, or a linear calculation, to include minimum and maximum bounds. In various embodiments, the polynomial calculation uses a static pressure of the ejection seat for the equivalent altitude, a dynamic pressure of the ejection seat for the equivalent airspeed, and four constants. In various embodiments, the static pressure is determined using the static pressure sensor coupled to the ejection seat. In various embodiments, the dynamic pressure is determined using at least one dynamic pressure sensor coupled to a pitot tube coupled to the ejection seat.

In various embodiments, the instructions further cause the processor to: responsive to the airspeed and the altitude indicating a first mode of operation, send a command to deploy the main parachute without deploying the drogue parachute. In various embodiments, the instructions further cause the processor to: responsive to the altitude indicating a third mode of operation: send the command to deploy the drogue parachute; determine whether a predetermined altitude has been achieved; and responsive to the predetermined altitude being achieved, send the command to sever the drogue parachute and deploy the main parachute.

Also disclosed herein is an ejection seat including a drogue parachute; a main parachute; a dynamic pressure sensor; a static pressure sensor; and an electronic sequencer configured to: determine an equivalent airspeed of the ejection seat using the dynamic pressure sensor; determine an equivalent altitude of the ejection seat using the static pressure sensor; and, responsive to the airspeed and the altitude indicating a second mode of operation: send a command to deploy the drogue parachute; determine a variable drogue severance delay; and responsive to the variable drogue severance delay expiring, send a command to sever the drogue parachute and deploy the main parachute.

In various embodiments, the variable drogue severance delay is determined using at least one of a polynomial calculation, a quadratic calculation, or a linear calculation, to include minimum and maximum bounds. In various embodiments, the polynomial calculation used a static pressure of the ejection seat for the equivalent altitude, a dynamic pressure of the ejection seat for the equivalent airspeed, and four constants. In various embodiments, the static pressure is determined using the static pressure sensor coupled to the back of the ejection seat. In various embodiments, the dynamic pressure is determined using at least one dynamic pressure sensor coupled to a pitot tube coupled to a headrest of the ejection seat.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
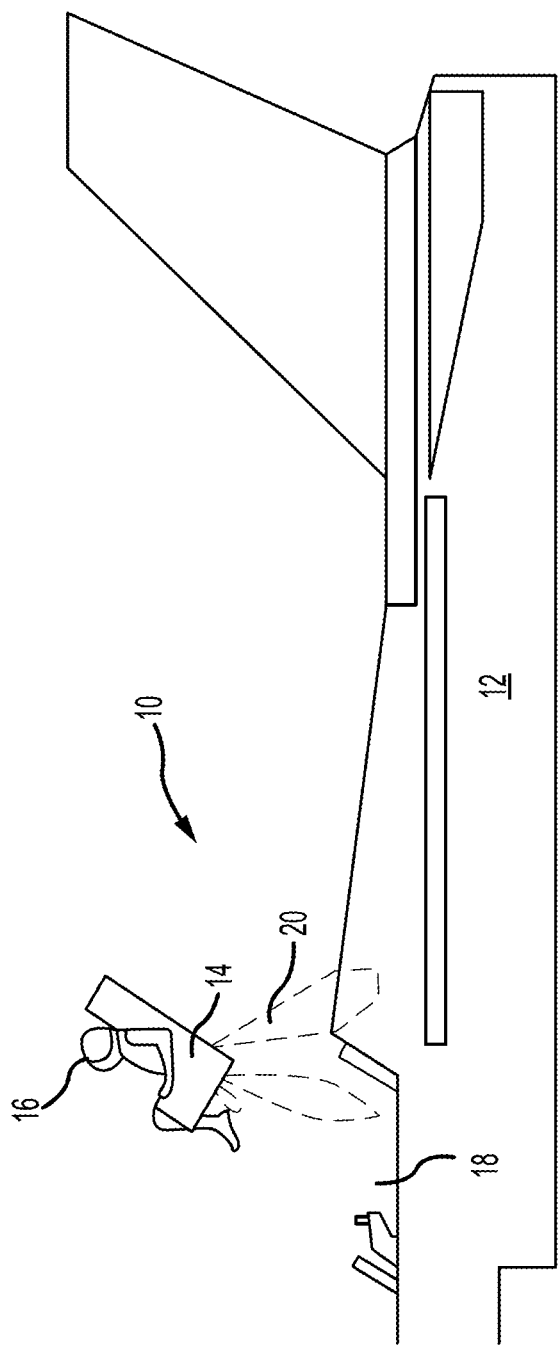
FIG. 1 illustrates an ejection seat being expelled from an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Current ejection seat systems have harsh mode boundary transitions from no drogue parachute deployment to fixed time deployments. Currently, at a low airspeed, low altitude type situations (Mode 1), the ejection seat does not deploy the drogue parachute and deploys the main parachute very rapidly. At higher airspeed and low altitude situations (Mode 2) and high altitude situations (Mode 3), deploying the main parachute immediately upon ejection of the ejection seat becomes too perilous, so a drogue parachute is deployed to decelerate the ejection seat to the safe velocity so that the main parachute may be later deployed safely. Historically, the timing between deployment of the drogue parachute and deployment of the main parachute in Mode 2 has a fixed timing and deployment of the drogue parachute and deployment of the main parachute in Mode 3 is based on altitude with some modulation based on airspeed. Further, in a two-place cockpit or a multi-place cockpit, where there are multiple ejections taking place in short sequence, a form of instability is induced. Currently, a divergence rocket coupled to each seat may be fired that rolls and/or yaws each ejection seat to change its trajectory by way of rotating the orientation of the main propulsion system thrust. However, while the divergence rocket control is useful at lower speeds, there is a certain speed threshold where divergence rocket control is not particularly useful as it may increase injury risk unnecessarily.

Disclosed herein is an integrated system that reduces the harsh nature of the cutovers between the low airspeed, low altitude type situations (Mode 1) and the high airspeed, high altitude type situations (Mode 2 & 3). In the described ejection system, the airspeed and altitude boundary for low airspeed, low altitude type situations (Mode 1) is lowered to an even safer range so that there are even fewer ejections that would result in a Mode 1 situation. In Mode 2 situations, a variable timing between deployment of the drogue parachute and the main parachute is implemented such that thresholds are implemented for how long the drogue parachute is deployed and how much the main parachute deployment is delayed. In various embodiments, a third order polynomial with four constants is employed. In various embodiments, a linear evaluation is employed. In various embodiments, a quadratic evaluation is employed. Additionally, a divergence rocket cutoff is employed so that the given speed, in the midst of Mode 2 and extending into Mode 3, divergence rocket usage is inhibited in two-place cockpit or a multi-place cockpit systems. Divergence rocket usage is typically, but not always, inhibited for single-place cockpit systems at all airspeeds. In Mode 3, main parachute deployment is delayed until the base pressure reading indicates that the ejection seat has fallen through a certain altitude, currently around 15,000 feet. It is noted that the Mode 3 boundary may be modulated somewhat based on airspeed due to wake effects.

Referring now to FIG. 1, in accordance with various embodiments, an aircraft ejection system 10 is illustrated. Ejection system 10 may be installed in aircraft 12 to expel an ejection seat 14 and an occupant 16 of the ejection seat 14 from a cockpit 18 of the aircraft 12. Ejection seat 14 may be urged from cockpit 18 by a propellant 20.

Figure 2A:
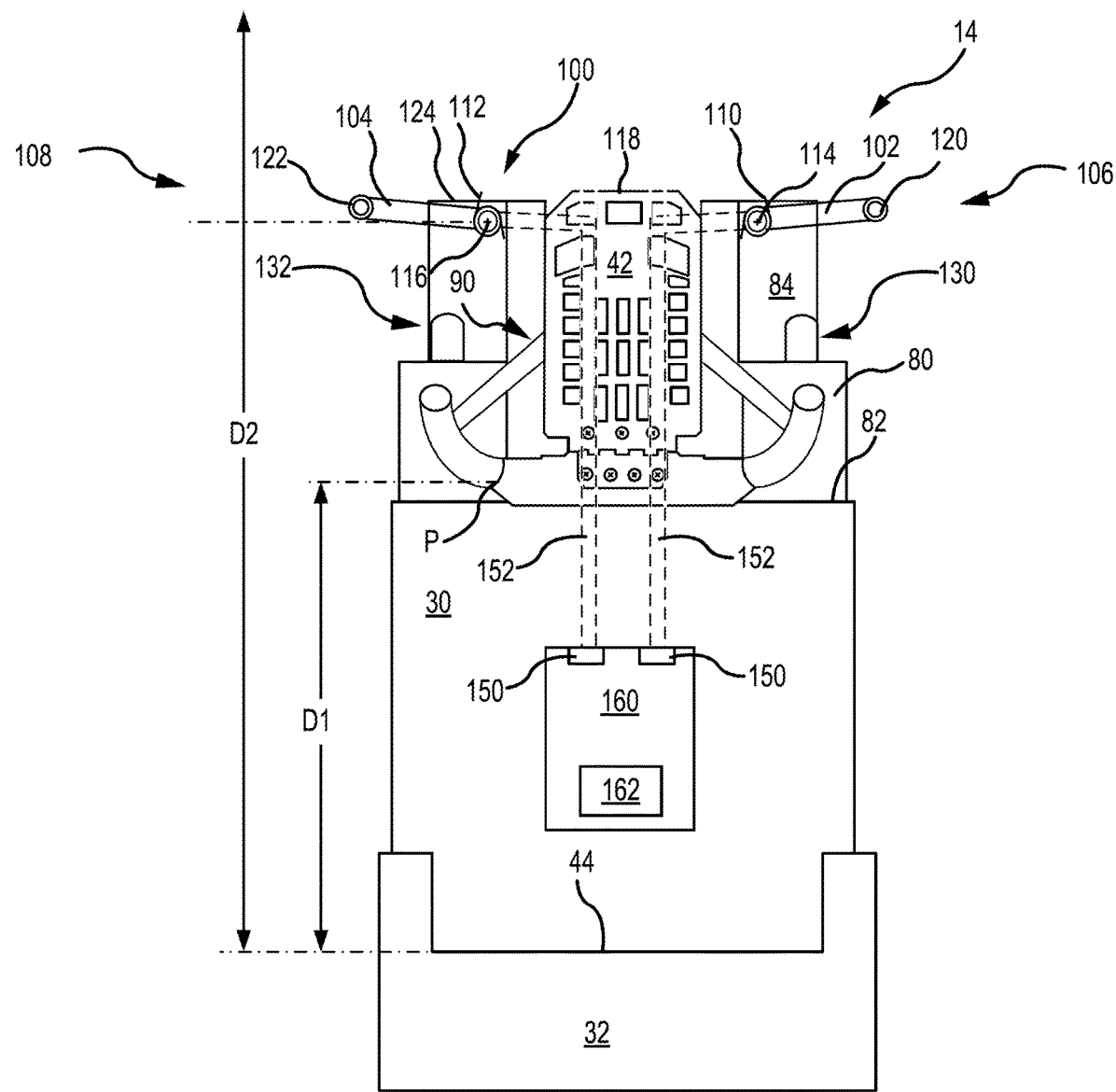
FIGS. 2A, 2B, and 2C illustrate an ejection seat having a pitot system, in accordance with various embodiments.
Figure 2B:
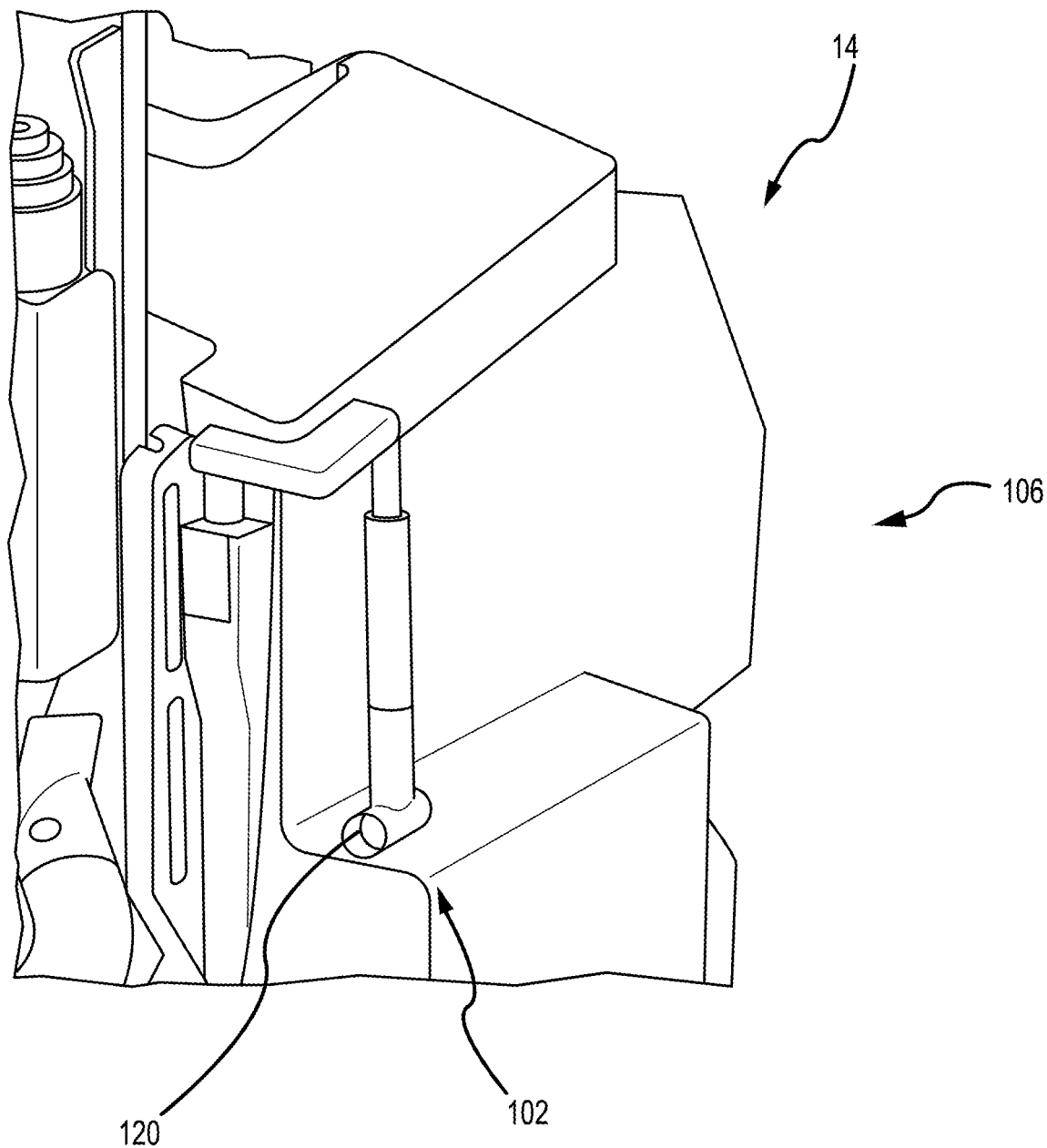
Figure 2C:
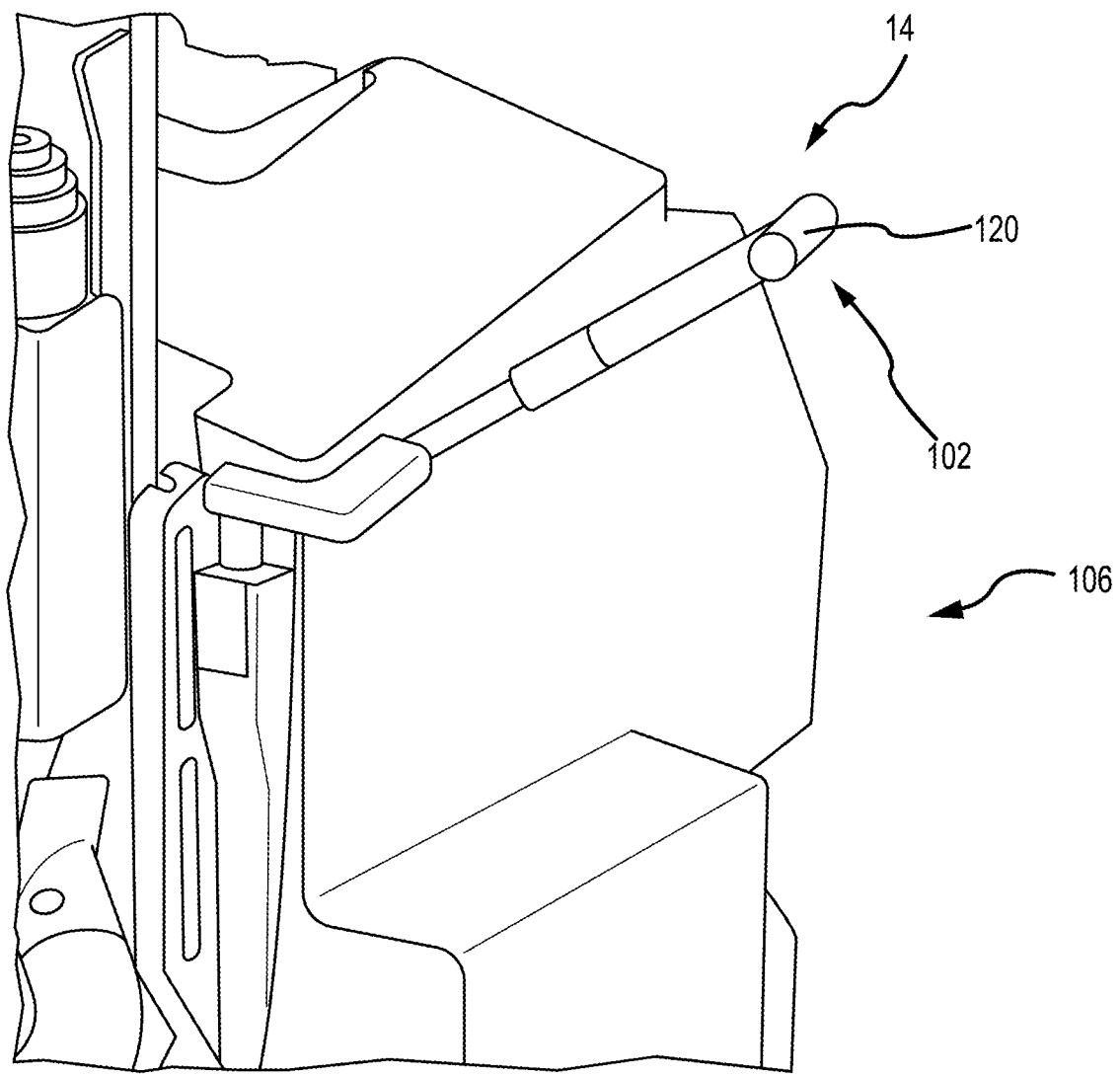

Referring now to FIGS. 2A-2C, in accordance with various embodiments, ejection seat 14 is illustrated. FIG. 2A illustrates a front view of ejection seat 14. FIG. 2B illustrates a perspective view of a portion of ejection seat 14 in non-deployed state (i.e., ejection seat 14 is illustrated prior to deployment of the ejection system 10 in FIG. 1). FIG. 2C illustrates a perspective view of a portion of ejection seat 14 in a deployed state (i.e., ejection seat 14 is illustrated after deployment of the ejection system 10 in FIG. 1). In accordance with various embodiments, ejection seat 14 includes a seatback 30 and a seat bucket 32. In various embodiments, an ejection handle may be located proximate a frontside of seat bucket 32. The ejection handle may be configured to initiate an ejection sequence upon actuation. For example, occupant 16 (FIG. 1) pulling ejection handle may initiate the ejection sequence that expels ejection seat 14 from aircraft 12 (FIG. 1).

In various embodiments, ejection seat 14 includes a main parachute assembly 80. Main parachute assembly 80 is located at an upper end 82 of seatback 30. As used herein, the term "upper" refers to an end or surface that is distal to, or generally farthest from, the floor of the cockpit 18 (FIG. 1). A main parachute may be housed in a main parachute container 84 of main parachute assembly 80. The main parachute deploys from main parachute container 84. The main parachute is attached to occupant 16 and is configured to safely convey occupant 16 to the ground after ejection.

Ejection seat 14 may also include a passive head and neck protection (PHNP) system 90. PHNP system 90 may deploy in response to initiation of the ejection sequence. PHNP system 90 deploys from a PHNP stowed position to a PHNP deployed position. In the PHNP deployed position, PHNP system 90 restricts rearward and side-to-side movement of the head and helmet of occupant 16. In various embodiments, headrest 42 may be coupled to and/or a part of PHNP system 90. In various embodiments, headrest 42 may be a canopy breaker standoff that serves as a headrest when in the stowed (i.e., non-ejected) position. PHNP system 90 is located proximate the upper end 82 of seatback 30. PHNP system 90 and headrest 42 may be located forward of main parachute assembly 80. To accommodate different height occupants, seat bucket 32 and seatback 30 may translate relative to PHNP system 90 and headrest 42, thereby changing a distance D1 between a pivot point P of PHNP system 90 and a seat 92 of seat bucket 32. Seat 92 is the component of seat bucket 32 on which occupant 16 sits. For example, seat 92 may be a cushion. In this regard, prior to ejection, the distance between PHNP system 90 and a floor and the distance between headrest 42 and floor do not change, but the distance D1 between seat 44 and pivot point P may be changed depending on the height of occupant 16. Main parachute assembly 80 may translate with seatback 30, relative to PHNP system 90 and headrest 42.

In accordance with various embodiments, ejection seat 14 includes a pitot system 100. Pitot system 100 is configured to rotate between a stowed position and a deployed position. In FIG. 2B, pitot system 100 is illustrated in the stowed position. In FIGS. 2A and 2C, pitot system 100 is illustrated in the deployed position. With combined reference to FIGS. 2A, 2B, and 2C, pitot system 100 includes a left (or first) pitot tube 102 and a right (or second) pitot tube 104. Left pitot tube 102 is rotatably coupled to a first (or left) side 106 of headrest 42. Right pitot tube 104 is rotatably coupled to a second (or right) side 108 of headrest 42. In various embodiments, left pitot tube 102 may be rotatably coupled to first side 106 of main parachute container 84 and right pitot tube 104 may be rotatably coupled to second side 108 of main parachute container 84, as illustrated in FIGS. 2B and 2C.

In accordance with various embodiments, a first tube biasing member 110 is configured to bias left pitot tube 102 away from first side 106 of headrest 42 and toward the deployed position of FIGS. 2A and 2C. A second tube biasing member 112 is configured to bias right pitot tube 104 away from second side 108 of headrest 42 and toward the deployed position. Stated differently, first tube biasing member 110 is configured to rotate left pitot tube 102 in a first circumferential direction about an axis of rotation 114 of left pitot tube 102, and second tube biasing member 112 is configured to rotate right pitot tube 104 in a second circumferential direction about an axis of rotation 116 of right pitot tube 104. The second circumferential direction is opposite the first circumferential direction.

Axis of rotation 114 of left pitot tube 102 is opposite, or distal to, a first air inlet 120 of left pitot tube 102. Axis of rotation 116 of right pitot tube 104 is opposite, or distal to, a second air inlet 122 of right pitot tube 104. Left pitot tube 102 and right pitot tube 104 are each coupled to headrest 42 such that axes of rotation 114, 116 are proximate an upper end 118 of headrest 42. Upper end 118 of headrest 42 may be the uppermost point of ejection seat 14. In this regard, axes of rotation 114, 116 may be above main parachute assembly 80. Stated differently, axes of rotation 114, 116 may be between an upper surface 124 of main parachute container 84 of main parachute assembly 80 and upper end 118 of headrest 42. In various embodiments, upper end 118 may be a backup canopy breaker, or piercer, and have a dynamic or fixed distance from the floor and/or canopy with relation to the seat back and seat bucket. In the stowed position, first and second air inlets 120, 122 may be located between upper surface 124 of main parachute container 84 of main parachute assembly 80 and axes of rotation 114, 116, respectively. In various embodiments, in the stowed position, first and second air inlets 120, 122 may be located between upper surface 124 of main parachute container 84 of main parachute assembly 80 and upper end 118 of headrest 42. As discussed in further detail below, the location of axis of rotation 114 and axis of rotation 116 are selected such that, when deployed, first air inlet 120 and second air inlet 122 are in the airstream (e.g., outside cockpit 18) after deployment of the ejection system 10 in FIG. 1). As discussed above, seat bucket 32 and seatback 30 translate relative to PHNP system 90 and headrest 42. Translation of seat bucket 32 and seatback 30 relative to headrest 42 changes a distance D2 between axes of rotation 114, 116 and seat bucket 32 of seat 44. In this regard, prior to ejection, the distance between axes of rotation 114, 116 and floor 46 does not change, but the distance D2 between seat 44 and axes of rotation 114, 116 may be changed depending on the height of occupant 16.

In accordance with various embodiments, a first pitot restraint assembly 130 is configured to maintain left pitot tube 102 in a restrained position. A second pitot restraint assembly 132 is configured to maintain right pitot tube 104 in the restrained position. Each of first pitot restraint assembly 130 and second pitot restraint assembly 132 are configured to translate between a restrained state and a released state. Left pitot tube 102 rotates to the deployed position in response to first pitot restraint assembly 130 translating to the released state. Right pitot tube 104 rotates to the deployed position in response to second pitot restraint assembly 132 translating to the released state.

First pitot restraint assembly 130 and second pitot restraint assembly 132 are configured to translate to the released state during expulsion of ejection seat 14. For example, first pitot restraint assembly 130 and second pitot restraint assembly 132 may translate to the released state in response to ejection seat 14 translating a threshold distance from the floor 46 of cockpit 18 (FIG. 1). In various embodiments, first pitot restraint assembly 130 and second pitot restraint assembly 132 may be configured to translate to the released state prior to deployment of the ejection system 10 (FIG. 1).

In the deployed position, fluid (e.g., air) enters left pitot tube 102 via first air inlet 120 and right pitot tube 104 via second air inlet 122. In various embodiments, left and right pitot tubes 102, 104 may be operably connected to pressure sensors 150 via conduits 152. In this regard, the fluid received at first and second air inlets 120, 122 is routed to pressure sensors 150 via conduits 152. Pressure sensors 150 may be part of and/or in communication with a controller 160. Controller 160 is configured to receive pressure measurements from pressure sensors 150.

Controller 160 may include one or more of a general-purpose processor, digital signal processor (DSP), application specific integrated circuit (ASIC), field programmable gate array (FPGA), or other programmable logic device, discrete gate, transistor logic, or discrete hardware components, or any various combinations thereof. A tangible, non-transitory computer-readable storage medium 162 may be in communication with controller 160. Storage medium 162 may comprise any tangible, non-transitory computer-readable storage medium known in the art. The storage medium 162 has instructions stored thereon that, in response to execution by controller 160, cause controller 160 to perform operations related to selecting an ejection mode based on dynamic pressure data received from the pressure sensors 150. In this regard, controller 160 receives dynamic pressure data from the pressure sensors 150 and selects an ejection mode based on dynamic pressure data. For example, controller 160 may determine an altitude and an airspeed based on the dynamic pressure data in conjunction with static pressure data and may select a timing sequence for deploying various subsystem of ejection seat 14 (e.g., selects an ejection mode) based on the altitude and airspeed. In various embodiments, the combination of dynamic (e.g. pitot) and static (e.g. base) pressure may be used in combination as proxy for equivalent airspeed and equivalent altitude.

Figure 3:
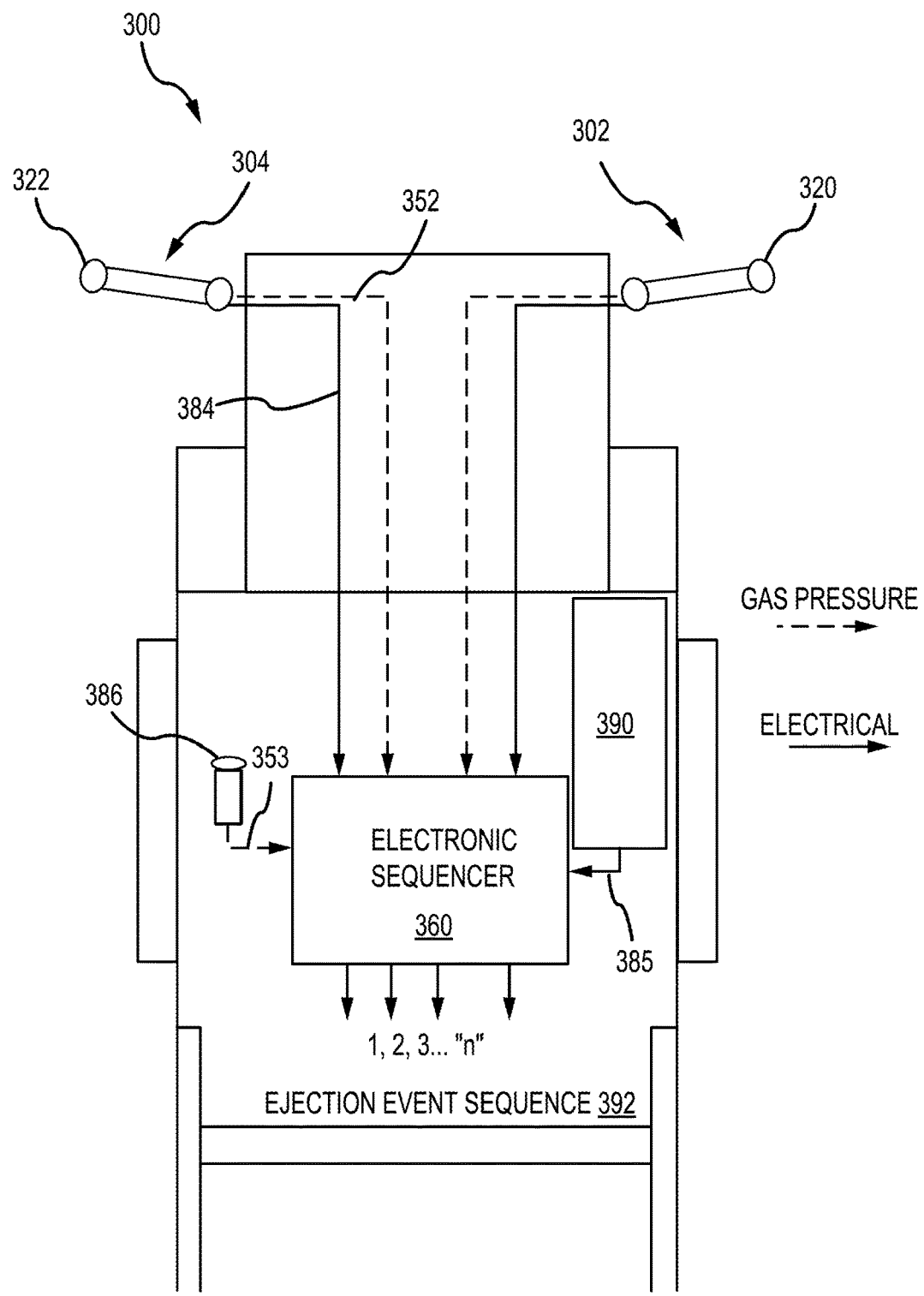
FIG. 3 illustrates an ejection system, in accordance with various embodiments.

Referring now to FIG. 3, in accordance with various embodiments, a diagram of an ejection system 300 is illustrated. Ejection system 300 includes a first pitot tube 302 including a first dynamic pressure sensor 320, a second pitot tube 304 including a second dynamic pressure sensor 322, an electronic sequencer 360, a static pressure sensor 386, and one or more accelerometers 390. First pitot tube 302 and second pitot tube 304 may be examples of pitot tubes 102, 104 described above with respect to FIGS. 2A-2C. In various embodiments, dynamic pressure sensors 320, 322 may be connected to electronic sequencer 360 via conduits 352 and/or wires 384. Electronic sequencer 360 may be an example of controller 160 described above with respect to FIGS. 2A-2C. In various embodiments, electronic sequencer 360 may be implemented as a procedural paradigm. In various embodiments, electronic sequencer 360 may be implemented as a state machine. In various embodiments, outputs from one or more of first dynamic pressure sensor 320, second dynamic pressure sensor 322, static pressure sensor 386, and/or accelerometer(s) 390 may be used as inputs for electronic sequencer 360.

Electronic sequencer 360 may comprise one or more processors configured to implement various logical operations in response to execution of instructions, for example, instructions stored on a non-transitory, tangible, computer-readable medium. The one or more processors can be a general-purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Electronic sequencer 360 may further comprise memory to store data, executable instructions, system program instructions, and/or controller instructions to implement the control logic of electronic sequencer 360.

Electronic sequencer 360 receives inputs from the various sensors, including first dynamic pressure sensor 320, second dynamic pressure sensor 322, and/or static pressure sensor 386, accelerometer(s) 390. Electronic sequencer 360 processes the received inputs and provides one or more ejection event sequence 392 that may be optimized for individual ejection sequence timing. In various embodiments, the individual ejection sequence timing may account for a weight difference in occupant 16 or other payload, an altitude difference and/or an airspeed difference, among others. The individualized ejections sequence may alter the timing of ejection events (e.g., parachute deployment, seat separation, etc.) by about 10 ms to about 900 ms, and more specifically, about 25 ms to about 250 ms. In various embodiments, the individualized ejection sequence may be altered by more than 900 ms.

In various embodiments, electronic sequencer 360 may use one or more of the available inputs to determine the ejection event sequence 392. For example, electronic sequencer 360 may use inputs from static pressure sensor 386 and one or both of dynamic pressure sensors 320, 322. As another example, electronic sequencer 360 may use inputs from static pressure sensor 386, one or both of dynamic pressure sensors 320, 322, and accelerometer(s) 390.

First and second dynamic pressure sensors 320, 322 may be operably connected to electronic sequencer 360 via conduits 352. Air received at first and second dynamic pressure sensors 320, 322 may be routed to electronic sequencer 360 via conduits 352. In various embodiments, electronic sequencer 360 may include a manifold, one or more transducers, and other components to measure the received air pressure. Electronic sequencer 360 may determine a dynamic pressure in response to receiving air via conduits 352. Static pressure sensor 386 may be operably connected to electronic sequencer 360 via a conduit 353. Air received at static pressure sensor 386 may be routed to electronic sequencer 360 via conduit 353. Electronic sequencer 360 may determine a static pressure in response to receiving air via conduit 353.

Accelerometer(s) 390 are operably coupled to electronic sequencer 360 via wires 385. Accelerometer(s) 390 may transmit linear acceleration data and/or rotational acceleration data to electronic sequencer 360 via wires 385. In various embodiments, accelerometer(s) may transmit linear rate values and/or rotational rate values. In various embodiments, accelerometer(s) 390 may be integral to electronic sequencer 360 so that wires 385 are not used. In various embodiments, accelerometer(s) 390 may include gyroscope. In various embodiments accelerometer(s) 390 may provide a combination of discrete measures of linear and/or rotational accelerations and/or rates about the degrees of freedom (e.g., x, y, and z).

Electronic sequencer 360 may process the received inputs and determine ejection event sequence 392. Electronic sequencer 360 may use inputs from first and second dynamic pressure sensors 320, 322 to determine an airspeed of ejection seat 14. In various embodiments, the inputs of the first and second dynamic pressure sensors 320, 322 may be averaged. In various embodiments, electronic sequencer 360 may use a moving average (i.e., an average of the inputs over a selected time period), a minimum value, or a maximum value of the inputs of the first and second dynamic pressure sensors 320, 322. Electronic sequencer 360 may use input from static pressure sensor 386 to determine an equivalent altitude of ejection seat 14. In various embodiments, electronic sequencer 360 may use input from accelerometer(s) 390 to determine a mass of occupant 16 and an ejected system mass of ejection seat 14, among other information such as total payload. Additionally, all or a portion of the data gathered from each sensor, whether or not it is used to determine ejection event sequence 392 may be stored for later analysis including mishap recreation and performance study, among others.

In various embodiments, ejection event sequence 392 may be designed for operation at various equivalent altitudes and equivalent airspeeds relative to sea level conditions or otherwise relative to standard atmospheric conditions. In various embodiments, electronic sequencer 360 may calculate equivalent airspeed values based on the inputs received from one or more of the sensors in ejection system 300. In various embodiments, electronic sequencer 360 may include a database, or other data structure, to store the airspeed equivalents for look up based on the inputs received from one or more of the sensors in ejection system 300.

Figure 4:
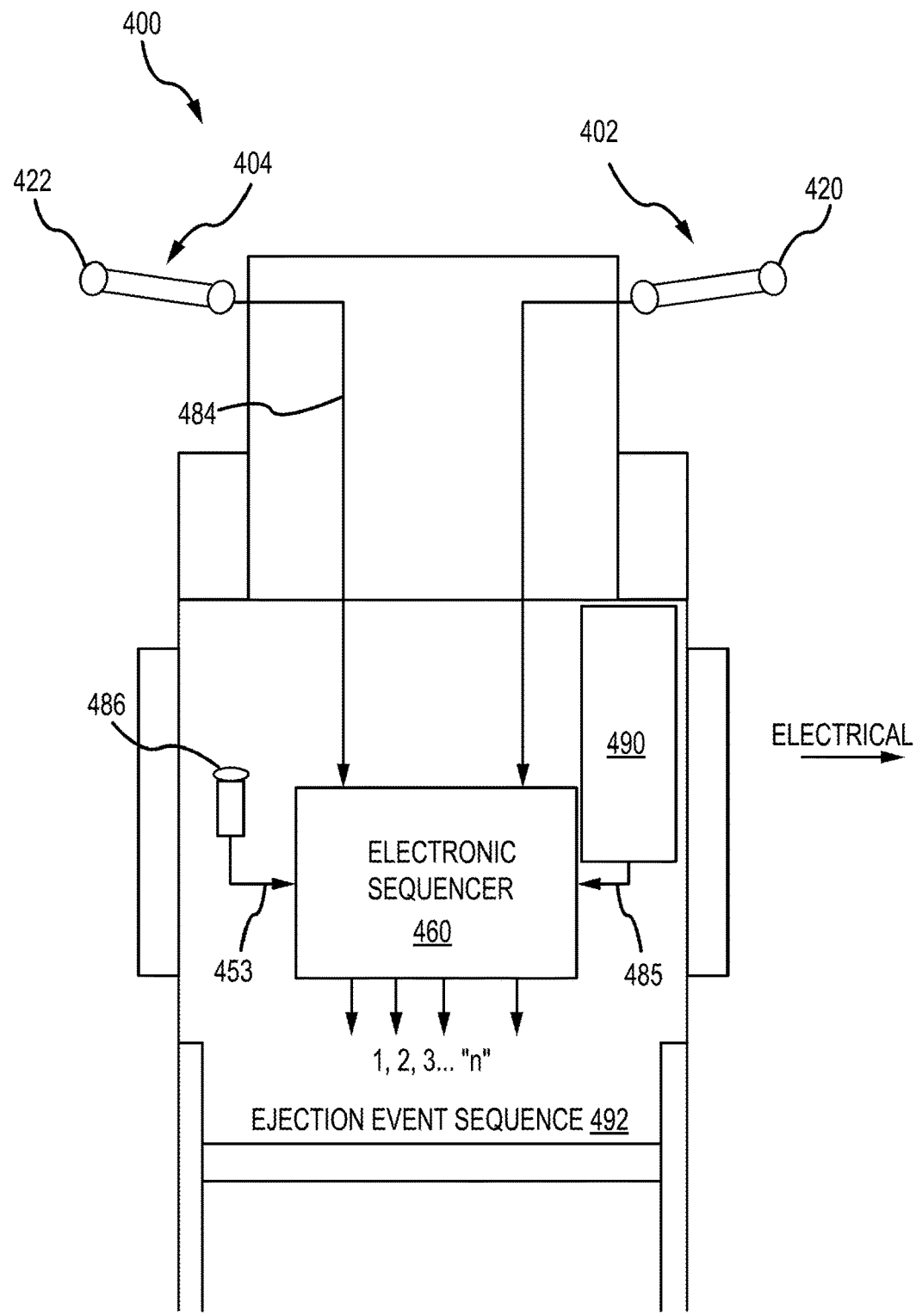
FIG. 4 illustrates an ejection system, in accordance with various embodiments.

Referring now to FIG. 4, in accordance with various embodiments, a diagram of an ejection system 400 is illustrated. Ejection system 400 includes similar components to those described above with respect to ejection system 300 in FIG. 3, including a first pitot tube 402 including a first dynamic pressure sensor 420, a second pitot tube 404 including a second dynamic pressure sensor 422, an electronic sequencer 460, a static pressure sensor 486, and one or more accelerometers 490. Descriptions of each may not be repeated below for simplicity. Electronic sequencer 460 may perform similar functions to those described above with respect to electronic sequencer 360.

First dynamic pressure sensor 420, second dynamic pressure sensor 422, and static pressure sensor 486 may include an embedded transducer allowing pressure readings to be performed at each sensor, respectively. Accordingly, connections between all the sensors of ejection system 400 and electronic sequencer 460 may be entirely electrical. In that regard, first dynamic pressure sensor 420 may be operably coupled to electronic sequencer 460 via wires 484. Second dynamic pressure sensor 422 may be operably coupled to electronic sequencer 460 via wires 484. Static pressure sensor 486 may be operably coupled to electronic sequencer 460 via wires 453.

Accelerometer(s) 490 are operably coupled to electronic sequencer 460 via wires 485. Accelerometer(s) 490 may transmit linear acceleration data and/or rotational acceleration data to electronic sequencer 460 via wires 485. In various embodiments, accelerometer(s) may transmit linear rate values and/or rotational rate values. In various embodiments, accelerometer(s) 490 may be integral to electronic sequencer 460 so that wires 485 are not used. In various embodiments, accelerometer(s) 490 may include gyroscope. In various embodiments accelerometer(s) 490 may provide a combination of discrete measures of linear and/or rotational accelerations and/or rates about the degrees of freedom (e.g., x, y, and z).

Figure 5:
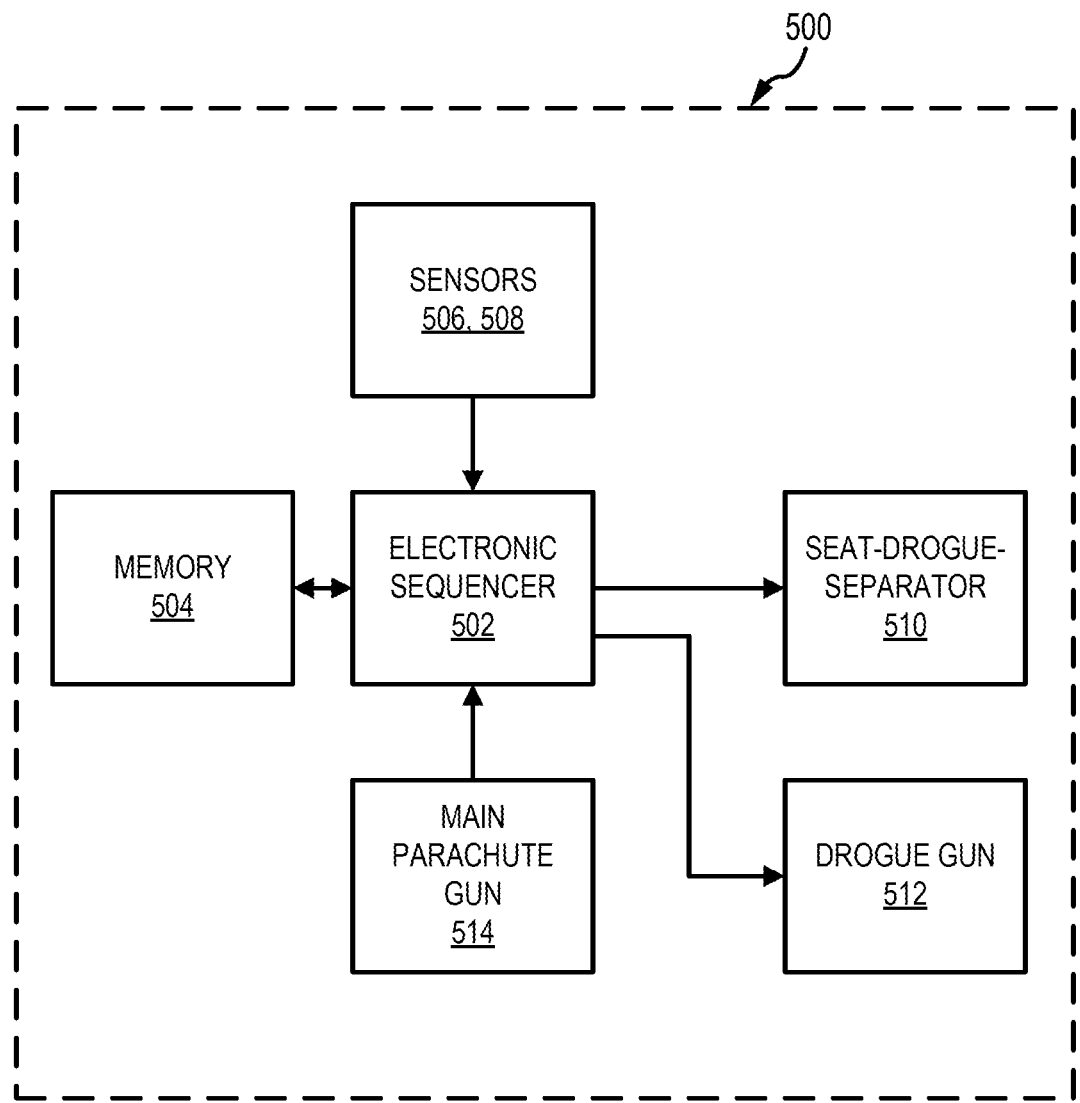
FIG. 5 illustrates a control system for an ejection seat deployment system, in accordance with various embodiments.

Referring now to FIG. 5, a schematic block diagram of a control system 500 for the ejection system 10 of the aircraft 12 is illustrated, in accordance with various embodiments. Control system 500 includes an electronic sequencer 502, which may be an electronic sequencer such as electronic sequencer 360 of FIG. 3 or electronic sequencer 460 of FIG. 4, is in electronic communication with sensors 506, 508, which may be sensors such as dynamic pressure sensors 320, 322 and static pressure sensor 386 of FIG. 3 or dynamic pressure sensors 420, 422 and static pressure sensor 486 of FIG. 4. In various embodiments, electronic sequencer 502 may be integrated into computer systems of ejection seat 14. In various embodiments, electronic sequencer 502 may be configured as a central network element or hub to access various systems and components of control system 500. In various embodiments, electronic sequencer 502 may comprise a processor. In various embodiments, electronic sequencer 502 may be implemented in a single processor. In various embodiments, electronic sequencer 502 may be implemented as and may include one or more processors and/or one or more tangible, non-transitory memories (e.g., memory 504) and be capable of implementing logic. Each processor can be a general-purpose processor, a digital signal processor (DSP), an application specific integrated circuit (ASIC), a field programmable gate array (FPGA) or other programmable logic device, discrete gate or transistor logic, discrete hardware components, or any combination thereof. Electronic sequencer 502 may comprise a processor configured to implement various logical operations in response to execution of instructions, for example, instructions stored on a non-transitory, tangible, computer-readable medium (e.g., memory 504) configured to communicate with electronic sequencer 502.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, electronic sequencer 502 may be in electronic communication with sensors 506, 508. Sensor 506, 508 may be disposed on ejection seat 14. For example, sensor 506 may comprise a static pressure sensor (e.g., an altimeter, a barometer, or any other sensor configured for use in determining an altitude of an aircraft 12). In various embodiments, sensor 508 is configured to provide sensor data corresponding to a speed of ejection seat 14. For example, sensor 508 may comprise a dynamic pressure sensor (e.g., to provide data to be used with static pressure data of sensor 506 for airspeed calculation), an optical sensor (e.g., a light detection and ranging (LiDAR) sensor, a photonic sensor or the like). Any sensor, or sensors configured for providing data to determine airspeed are within the scope of this disclosure. Based on the variable data measured from the sensors 506, 508 and receiving an ejection command, the sequence controller may initiate a sequence of ejection events as described further herein.

In various embodiments, the control system 500 further comprises a seat-drogue-separator 510, a drogue gun, rocket, mortar, or the like 512, and a main parachute gun 514 (or mortar). The drogue gun 512 is configured to deploy a drogue parachute 610 from the ejection seat 14 of FIG. 2 from a stowed state (e.g., FIG. 2) to a deployed state (e.g., FIG. 6A). Similarly, the main parachute gun 514 is configured to deploy the main parachute 620 from a stowed state (e.g., FIG. 2) to a deployed state (e.g., FIG. 6A). The seat-drogue-separator 510 is configured to sever the drogue parachute 610 from the ejection seat 14 during an ejection event (e.g., as shown in FIG. 6B). In various embodiments, the seat-drogue-separator 510 may comprise any separation mechanism known in the art, such as a guillotine, a release latch, a shape charge, or the like. The present disclosure is not limited in this regard. As described further herein, in response to the ejection command or any other reference control signal indicating an ejection event is occurring or the ejection seat 14 and based on at least two variables from the sensors 506, 508, the electronic sequencer 502 may perform method 800 in FIG. 8 as described further herein. Although illustrated as including the seat-drogue-separator 510, the drogue gun 512, the main parachute gun 514, the present disclosure is not limited in this regard. For example, the control system 500 may further include a stabilization system firing, a supplemental propulsion system firing, or any other ejection seat system known in the art.

Figure 6A:
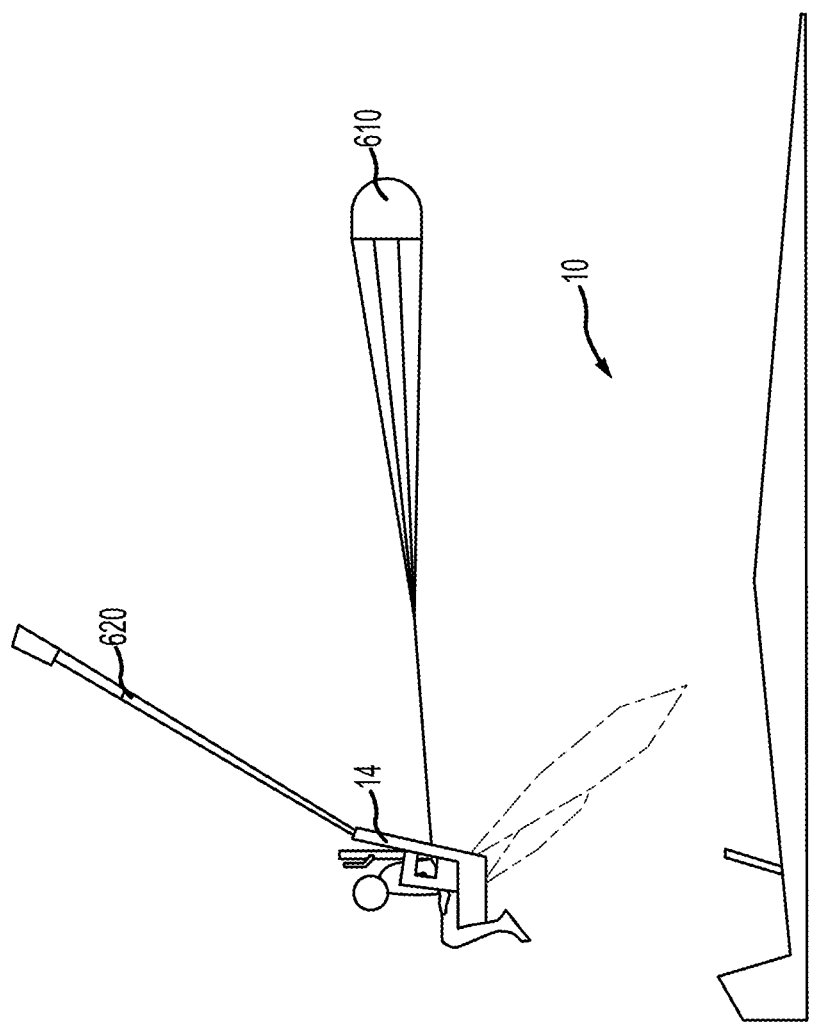
FIG. 6A illustrates an ejection seat after deployment, in accordance with various embodiments.
Figure 6B:
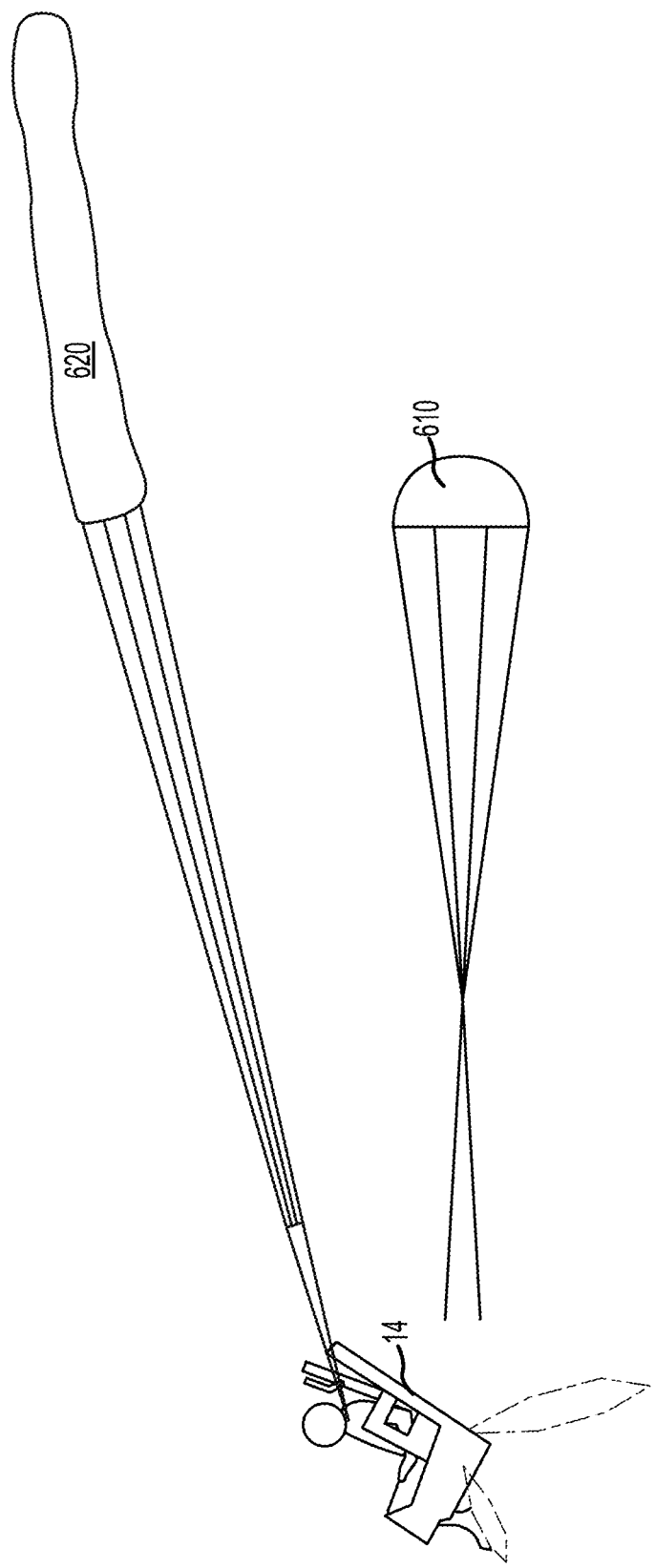
FIG. 6B illustrates an ejection seat after deployment and severance of a drogue parachute, in accordance with various embodiments.
Figure 7:
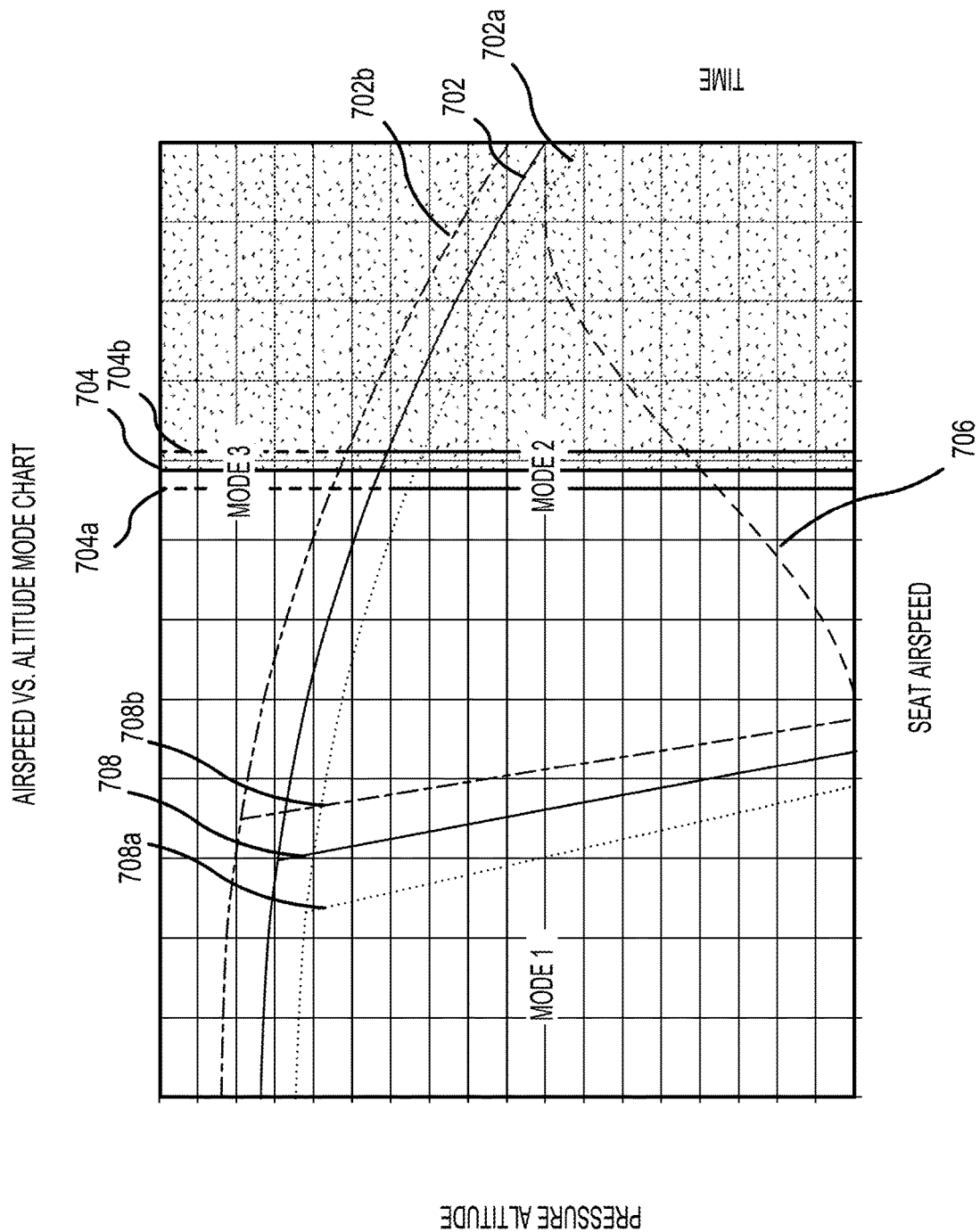
FIG. 7 illustrates a chart of altitude versus aircraft speed for various ejection sequence modes, in accordance with various embodiments.

Referring now to FIG. 7, in accordance with various embodiments and in relation to FIGS. 5, 6A, and 6B, a chart of altitude (left vertical axis) versus aircraft speed (horizontal axis) for various ejection sequence modes is illustrated. In various embodiments, the electronic sequencer 502 may be configured to initiate a deployment sequence based on an equivalent speed of the ejection seat 14 and an equivalent altitude of the ejection seat 14 just after an ejection event has been detected. In this regard, the electronic sequencer 502 may command deployment of only the main parachute 620 in response to being in Mode 1 (low altitude, low airspeed situations), in accordance with various embodiments. The electronic sequencer 502 may command deployment of the drogue parachute 610 first, severance of the drogue parachute 610 after a period of time (e.g., 0.6-1.4 seconds), followed by deployment of the main parachute 620 in response to being in Mode 2 (low altitude, high airspeed situations). In various embodiments, the period time of after which the drogue parachute 610 is severed and the main parachute 620 deployed is variable based upon the determined dynamic pressure (e.g., equivalent airspeed) and determined base pressure (e.g., equivalent pressure altitude) using a polynomial calculation, quadratic calculation, linear calculation, among others. In various embodiments, as one example, a polynomial formula is used to determine a delay (D) between deployment of the drogue parachute 610 and severance of the drogue parachute 610 followed by deployment of the main parachute 620. In various embodiments, the polynomial formula uses the determined base pressure (BP) detected by static pressure sensor 386 of FIG. 3, static pressure sensor 486 of FIG. 4, or sensor 506 of FIG. 5 and the determined dynamic pressure (DP) detected by dynamic pressure sensors 320, 322 of FIG. 3, dynamic pressure sensors 420, 422 of FIG. 4, or sensor 508 of FIG. 5, and four constant values $c_1$, $c_2$, $c_3$, and $c_4$ using the following polynomial equation:

$$D = c_1 - c_2 * BP - c_3 * DP - c_4 * (BP/DP)^2.$$

In various embodiment, if the determined delay (D) is less than a predetermined low threshold, then the delay (D) is set to a first value associated with the predetermined low threshold. In various embodiment, the predetermined low threshold may between 0.4 and 0.8 seconds, or more preferably between 0.5 and 0.7 seconds, or even more preferably 0.6 seconds. In various embodiment, if the determined delay (D) is greater than a predetermined high threshold, then the delay (D) is set to a second value associated with the predetermined high threshold. In various embodiment, the predetermined high threshold may be between 1.2 and 1.6 seconds, or more preferably between 1.3 and 1.5 seconds, or even more preferably 1.4 seconds. In FIG. 7, the variable delay (D) is indicated by line 706 (right vertical axis).

In response to being in Mode 3 (high altitude situations), the electronic sequencer 360 may command deployment of the drogue parachute 610 first for a long period of time with delayed severance of the drogue parachute 610 and deployment of main parachute 620 until a threshold static or base pressure (e.g., equivalent "fall through" pressure altitude) is achieved, as long as a minimum viable drogue severance delay has also expired. In FIG. 7, the mode boundary between Modes 1, 2, and 3 is illustrated via mode boundary line 702. In various embodiments, the mode boundary line 702 may shift within a variable tolerance band based on factors such as sensor accuracy, wake effects, and/or other factors to a lower airspeed and/or lower altitude but not to exceed a lower mode boundary line tolerance 702a or to a higher airspeed and/or higher altitude but not to exceed an upper mode boundary line tolerance 702b, to include potential for changes in slope and/or curvature. Also illustrated in FIG. 7 is a divergence cutoff 704 that is employed so that the given speed, in the midst of Mode 2 and extending into Mode 3, divergence rocket firing in two-place cockpit or a multi-place cockpit systems is inhibited. Divergence rocket usage is typically (but not always) omitted for single-place cockpit systems at all airspeeds. It is noted that inhibiting the divergence rocket firing event is non-detrimental (i.e., non-participatory) when divergence rocket(s) is/are not present/connected within the system. It is noted that the divergence cutoff 704 may shift within a variable tolerance band based on factors such as sensor accuracy, wake effects, and/or other factors to a lower airspeed and/or lower altitude but not to exceed a lower mode boundary line tolerance 704a or to a higher airspeed and/or higher altitude but not to exceed an upper mode boundary line tolerance 704b, to include potential for changes in slope and/or curvature. Also illustrated in FIG. 7 is a boundary 708 between Mode 1 and Mode 2. It is noted that boundary 708 may shift within a variable tolerance band based on factors such as sensor accuracy, wake effects, and/or other factors to a lower airspeed and/or lower altitude but not to exceed a lower mode boundary line tolerance 708a or to a higher airspeed and/or higher altitude but not to exceed an upper mode boundary line tolerance 708b, to include potential for changes in slope and/or curvature.

Figure 8:
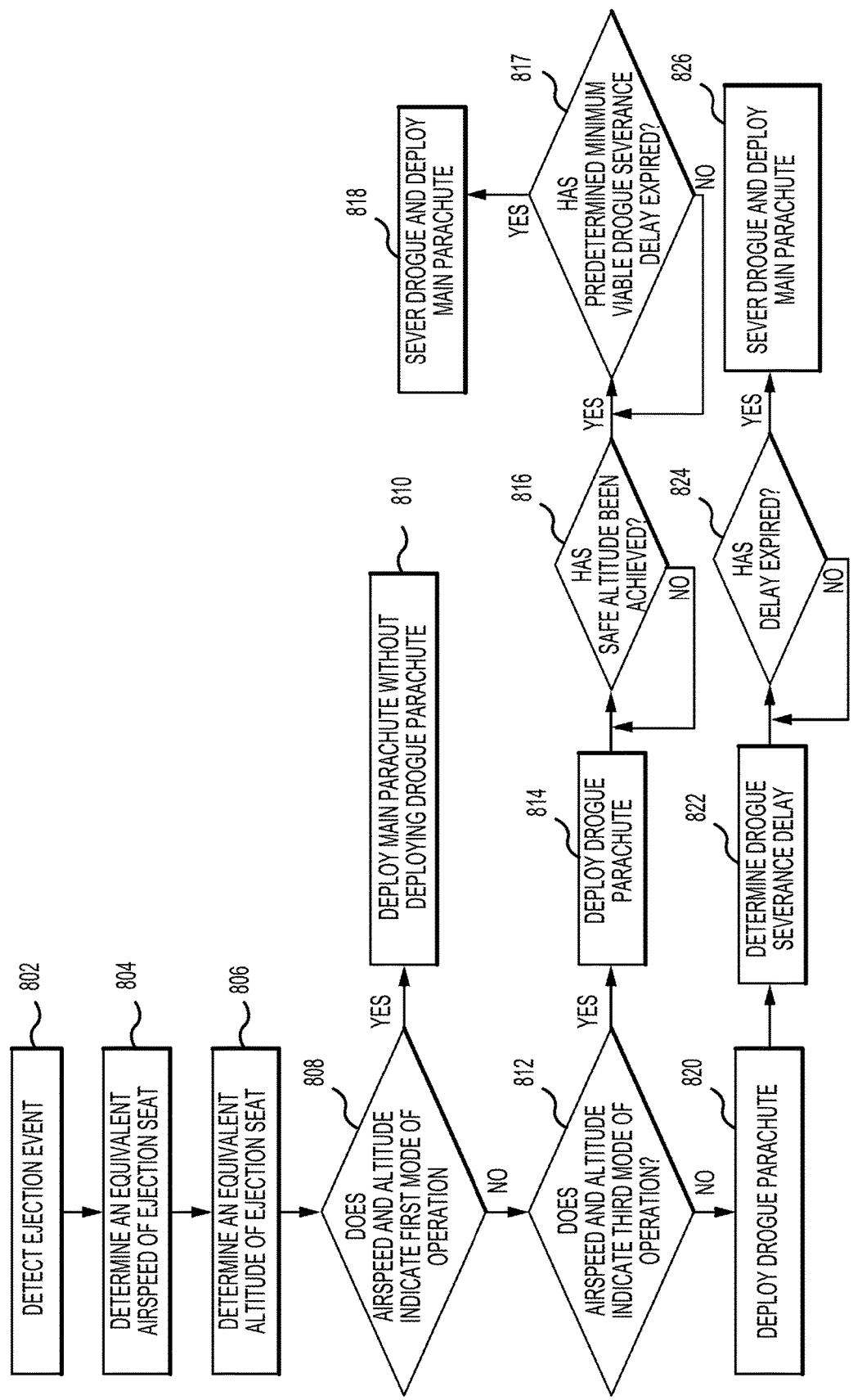
FIG. 8 illustrates a flow diagram for controlling an ejection sequence, in accordance with various embodiments.

Referring now to FIG. 8, in accordance with various embodiments, a method 800 for controlling an ejection sequence is illustrated. Method 800 may be performed by processor such as described above with respect to controller 160, electronic sequencer 360, electronic sequencer 460, or electronic sequencer 502. At block 802, the processor receives an ejection command for ejecting an ejection seat from an aircraft. At block 804, the processor determines an equivalent airspeed of the ejection seat via sensors, such as first dynamic pressure sensor 320 and second dynamic pressure sensor 322, first dynamic pressure sensor 420 and second dynamic pressure sensor 422, or sensor 508. At block 806, the processor determines an equivalent altitude of the ejection seat via sensors, such as static pressure sensor 386, static pressure sensor 486, or sensor 506. At block 808, the processor determines whether the determined airspeed and altitude identifies a first mode of operation. If at block 808 the processor determines that the determined airspeed and altitude identifies the first mode of operation, then, at block 810, the processor sends a command to deploy the main parachute without deploying the drogue parachute. If at block 808 the processor determines that the determined airspeed and altitude fails to identify the first mode of operation, then, at block 812, the processor determines whether the determined airspeed and altitude identifies a third mode of operation.

If at block 812 the processor determines that the determined airspeed and altitude identifies the third mode of operation, then, at block 814, the processor deploys the drogue parachute and, at block 816, determines whether a predetermined altitude has been reached. If at block 816 the predetermined altitude has not been achieved, then the process returns to block 816. If at block 816 the predetermined altitude has been achieved, then, at block 817, the processor determines whether a predetermined minimum viable drogue severance delay has expired. If at block 817 the minimum viable delay has expired, then, at block 818, the processor sends a command to sever the drogue parachute and deploy the main parachute. If at block 817 the minimum viable delay has not expired, then the process returns to block 817. If at block 812 the processor determines that the determined airspeed and altitude fails to identify the third mode of operation thereby indicating a second mode of operation, then, at block 820, the processor sends a command to deploy the drogue parachute and, at block 822, determines a variable drogue severance delay using a polynomial calculation, quadratic calculation, or linear calculation, among others. At block 824 and using the determined variable drogue severance delay, the processor determines whether the variable drogue severance delay (to include maximum and minimum viable bounds) has expired. If at block 824 the variable drogue severance delay has not expired, then the process returns to block 824. If at block 824 the variable drogue severance delay has expired, then, at block 826, the processor sends a command to sever the drogue parachute and deploy the main parachute. It is understood that other ejection event signals (not shown) preceding or following events 810, 814, 818, 820, and/or 826 may be executed by the processor with fixed or variable timing relative to those events or other inputs depending on the application.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:
   receiving, by a processor, an ejection command for ejecting an ejection seat from an aircraft;
   determining, by the processor, an equivalent airspeed and an equivalent altitude of the ejection seat; and
   responsive to the airspeed and the altitude indicating a second mode of operation:
      sending, by the processor, a command to deploy a drogue parachute;
      determining, by the processor, a variable drogue severance delay; and
      responsive to the variable drogue severance delay expiring, sending, by the processor, a command to sever the drogue parachute and deploy a main parachute.

2. The method of claim 1, wherein the variable drogue severance delay is determined using at least one of a polynomial calculation, a quadratic calculation, or a linear calculation, to include minimum and maximum bounds.

3. The method of claim 2, wherein the polynomial calculation uses a static pressure of the ejection seat for the equivalent altitude, a dynamic pressure of the ejection seat for the equivalent airspeed, and four constants.

4. The method of claim 3, wherein the static pressure is determined using a static pressure sensor coupled to the ejection seat.

5. The method of claim 3, wherein the dynamic pressure is determined using at least one dynamic pressure sensor coupled to a pitot tube coupled to the ejection seat.

6. The method of claim 1, further comprising:
   responsive to the airspeed and the altitude indicating a first mode of operation, sending, by the processor, a command to deploy the main parachute without deploying the drogue parachute.

7. The method of claim 1, further comprising:
   responsive to the altitude indicating a third mode of operation:
      sending, by the processor, the command to deploy the drogue parachute;
      determining, by the processor, whether a predetermined altitude has been achieved and whether a minimum viable delay has expired; and
      responsive to the predetermined altitude being achieved and the minimum delay being expired, sending, by the processor, the command to sever the drogue parachute and deploy the main parachute.

8. The method of claim 1, wherein the determining of the airspeed and the altitude of the ejection seat is further based on an equivalent altitude and an equivalent airspeed relative to sea level conditions.

9. A system, comprising:
   an ejection seat including a drogue parachute and a main parachute;
   a dynamic pressure sensor;
   a static pressure sensor;
   a processor; and
   memory operatively coupled to the processor, the memory comprising instructions stored thereon that, when executed by the processor, cause the processor:
      determine an equivalent airspeed of the ejection seat using the dynamic pressure sensor;
      determine an equivalent altitude of the ejection seat using the static pressure sensor; and
      responsive to the airspeed and the altitude indicating a second mode of operation:
         send a command to deploy the drogue parachute;
         determine a variable drogue severance delay; and
         responsive to the variable drogue severance delay expiring, send a command to sever the drogue parachute and deploy the main parachute.

10. The system of claim 9, wherein the variable drogue severance delay is determined using at least one of a polynomial calculation, a quadratic calculation, or a linear calculation, to include minimum and maximum bounds.

11. The system of claim 10, wherein the polynomial calculation uses a static pressure of the ejection seat for the equivalent altitude, a dynamic pressure of the ejection seat for the equivalent airspeed, and four constants.

12. The system of claim 11, wherein the static pressure is determined using the static pressure sensor coupled to the ejection seat.

13. The system of claim 11, wherein the dynamic pressure is determined using at least one dynamic pressure sensor coupled to a pitot tube coupled to the ejection seat.

14. The system of claim 9, wherein the instructions further cause the processor to:
   responsive to the airspeed and the altitude indicating a first mode of operation, send a command to deploy the main parachute without deploying the drogue parachute.

15. The system of claim 9, wherein the instructions further cause the processor to:
   responsive to the altitude indicating a third mode of operation:
      send the command to deploy the drogue parachute;
      determine whether a predetermined altitude has been achieved and whether a minimum viable delay has expired; and
      responsive to the predetermined altitude being achieved and the minimum delay being expired, send the command to sever the drogue parachute and deploy the main parachute.

16. An ejection seat, comprising:
   a drogue parachute;
   a main parachute;
   a dynamic pressure sensor;
   a static pressure sensor; and
   an electronic sequencer configured to:
      determine an equivalent airspeed of the ejection seat using the dynamic pressure sensor;
      determine an equivalent altitude of the ejection seat using the static pressure sensor; and
      responsive to the airspeed and the altitude indicating a second mode of operation:
         send a command to deploy the drogue parachute;
         determine a variable drogue severance delay; and
         responsive to the variable drogue severance delay expiring, send a command to sever the drogue parachute and deploy the main parachute.

17. The ejection seat of claim 16, wherein the variable drogue severance delay is determined using at least one of a polynomial calculation, a quadratic calculation, or a linear calculation, to include minimum and maximum bounds.

18. The ejection seat of claim 17, wherein the polynomial calculation uses a static pressure of the ejection seat for the equivalent altitude, a dynamic pressure of the ejection seat for the equivalent airspeed, and four constants.

19. The ejection seat of claim 18, wherein the static pressure is determined using the static pressure sensor coupled to the ejection seat.

20. The ejection seat of claim 19, wherein the dynamic pressure is determined using at least one dynamic pressure sensor coupled to a pitot tube coupled to a headrest of the ejection seat.

* * * * *